United States Patent [19]
Suzuki et al.

[11] Patent Number: 5,361,179
[45] Date of Patent: Nov. 1, 1994

[54] DATA RECORDING AND/OR REPRODUCING APPARATUS AND METHOD

[75] Inventors: Hideto Suzuki; Yukio Taniyama; Yoshikazu Nakamura, all of Kanagawa, Japan

[73] Assignee: Sony Corporation, Tokyo, Japan

[21] Appl. No.: 850,805

[22] Filed: Mar. 13, 1992

[30] Foreign Application Priority Data

Mar. 17, 1991 [JP] Japan ................................. 3-076790
Mar. 17, 1991 [JP] Japan ................................. 3-076791
Apr. 30, 1991 [JP] Japan ................................. 3-126927

[51] Int. Cl.⁵ ........................................... G11B 15/18
[52] U.S. Cl. ................................. 360/72.2; 360/64
[58] Field of Search ............... 360/71, 72.2, 32, 48, 360/64

[56] References Cited

U.S. PATENT DOCUMENTS

| | | | |
|---|---|---|---|
| 4,298,897 | 11/1981 | Arter et al. | 360/39 |
| 4,496,997 | 1/1985 | Ohtsuki | 360/13 |
| 5,081,548 | 1/1992 | Inazawa et al. | 360/72.2 |
| 5,121,269 | 6/1992 | Tsuchida et al. | 360/72.2 |
| 5,179,479 | 1/1993 | Ahn | 360/72.1 |

FOREIGN PATENT DOCUMENTS 0316304 5/1989 European Pat. Off. .
0386362 9/1990 European Pat. Off. .

OTHER PUBLICATIONS

Neues Aus Der Technik No. 1, 15 Feb. 1990, Wurzburg, DE p. 1, XP000105545 "Das Aktualisieren des Inhaltsverzeichnisses auf dem Aufzeichnungstrager in einem DAT-Spieler" right column, line 22-23.
Funkschau vol. 58, No. 23, Nov. 1986, Munchen, DE pp. 36-39 H.P. Siebert "Das Magnetband halt Schritt" Fig. 1.

*Primary Examiner*—Richard A. Bertsch
*Assistant Examiner*—Charles G. Freay
*Attorney, Agent, or Firm*—William S. Frommer; Alvin Sinderbrand

[57] ABSTRACT

A data recording and/or reproducing apparatus records and/or reproduces data and data management information corresponding to the data on helical recording tracks. It can be feasible to detect the use of the helical record tracks in reproducing and immediately access the recorded data, the data record region and the data management region in recording or reproducing.

16 Claims, 8 Drawing Sheets

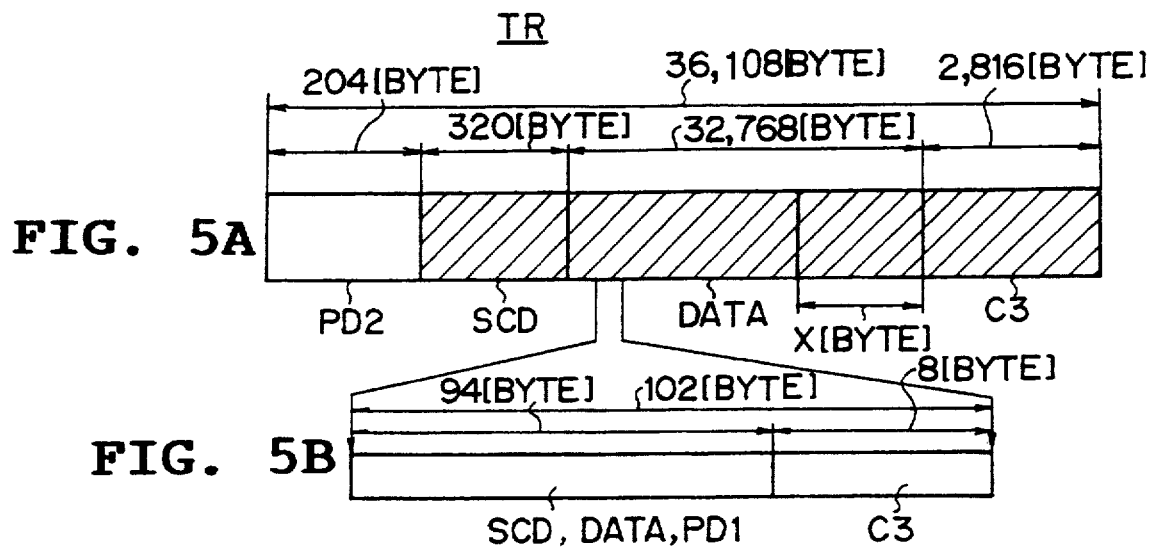
FIG. 5A
FIG. 5B
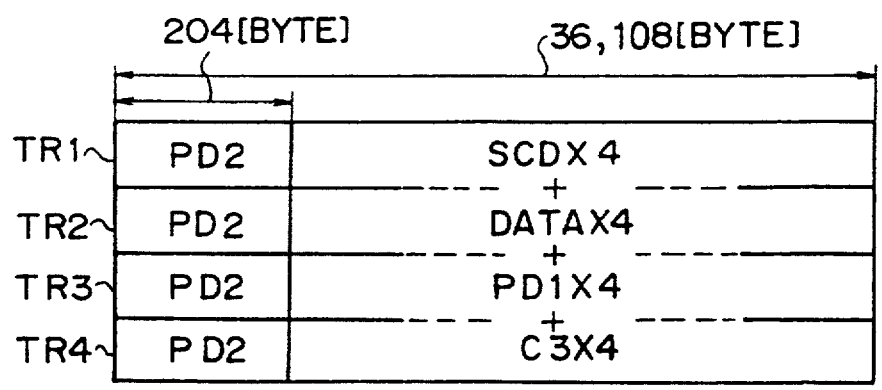
FIG. 6

DATA RECORDING AND/OR REPRODUCING APPARATUS AND METHOD

BACKGROUND OF THE INVENTION

This invention relates to a data recording and/or reproducing apparatus and method, and more particularly is suitable for applying to a computer external memory and the like, for example.

In a magnetic tape recording and reproducing apparatus of this kind, proposed hitherto is the so-called ID-1 format data recorder (ANSI x3.175-1990 19 mm Type ID-1 Recorded Instrumentation), wherein recording tracks are formed obliquely in sequence on a magnetic tape, and thus desired data can be recorded and reproduced in high density.

That is, as shown in FIG. 1, in such data recorder, a magnetic tape 1 is wound on a rotary drum rotating at a predetermined speed, the magnetic tape 1 is run at a predetermined speed, thereby forming recording tracks TR ( . . . TR1, TR2, TR3, TR4, TR1, TR2, . . . ) obliquely in sequence by the magnetic head mounted on the rotary drum, and thus desired data is recorded on the recording track TR.

Further in this case, the data recorder forms recording tracks TA, CTL and TC extending longitudinally on both upper and lower ends of the magnetic tape 1, and a track set identification (ID) of the recording tracks TR is recorded on the recording track CTL.

Here the track set identification (ID) is absolute position information beginning from the first of the magnetic tape 1, put between predetermined synchronizing signals, and is recorded at a 4-track period with reference to the recording tracks TR.

Further the recording tracks TA and TC are ready for recording user's controlling data and others, thus data recorded in high density on the recording tracks TR can be searched simply by reproducing the recording tracks TA, CTL and TC.

Further in the data recorder, when recording data on the recording tracks TR, an error detecting/correcting parity code comprising the so-called product code is applied to record the data concerned, thereby recording and reproducing desired data securely.

That is, as shown in FIG. 2, after loading in data DATA in a predetermined unit (=36,108 [BYTE]), the data recorder divides the data DATA into 306 blocks, and applies Reed-Solomon error detecting/correcting code (comprising C2 code) at each block.

Further, after dividing the block into a first field FIELD0 and a second field FIELD1, the data recorder applies Reed-Solomon error detecting/correcting code (comprising C1 code) so as to come orthogonal with the C2 code.

Thus in the data recorder, a bit error rate can be enhanced by correcting erroneous reproducing data by means of the C1 and C2 codes in reproducing.

Further in the data recorder, when recording the data DATA with the C1 and C2 codes applied thereto in the magnetic tape 1, interleaving is effected at every recording tracks TR, thus where a drop-out or the like arises, the data DATA can be reproduced securely.

That is, in the data recorder, with reference to the data DATA inputted in the order indicated by arrows a1, a2, . . . , an−1, an, an+1, an+2, . . . , ax−1 and ax, the data DATA is recorded by changing the inputting order as indicated by arrows b1, b2, . . . , bn−1 and bn, thereby interleaving the data DATA.

Further in the data recorder in this case, a synchronizing signal SYNC and sync block data ID are added at every predetermined unit (hereinafter called sync block), and preamble and postamble data are added as a whole to record the data DATA.

Thus in reproducing, in the magnetic recording and reproducing apparatus, the synchronizing signal SYNC, the sync block data ID and the data DATA are reproduced on the basis of track sync data included in the preamble, and subjected to deinterleaving on the basis of the synchronizing signal SYNC and the sync block data ID.

Further from interleaving, an error exceeding an error correcting capacity of the C1 and C2 codes is prevented from concentrating into one spot effectively even in case drop-out or the like has arisen.

Meanwhile, in the ID-1 format data recorder for reproducing desired data as described above, a bit error rate $10^{-10}$ which is sufficient practically as the data recording and reproducing apparatus intended mainly for measurement is ensured.

If the bit error rate can be enhanced to $10^{-15}$ or so, then it is conceivable that important data may be safedeposit from applying to a magnetic tape recorder for computer system working, for example, in banks or the like.

Accordingly, a serviceability of this kind of data recorder will be enhanced to expand the applicable field.

SUMMARY OF THE INVENTION

In view of the foregoing, an object of this invention is to provide a data recording and/or reproducing apparatus and method in which is capable of improving the bit error rate remarkably as compared with a prior art one.

The foregoing object and other objects of the invention have been achieved by the provision of a data recording and/or reproducing apparatus wherein absolute position information TS of helical record tracks TR are recorded on a longitudinal record track CTL of a magnetic tape 1 and the helical record track TR of said magnetic tape 1 are sequentially assigned to a data management region DITA and a data record region UDA; the record data information and the absolute position information TS regarding to data recorded on said helical record track TR of the data record region UDA; and the data recorded on the helical record track TR of the data management region DITA are searched according to the content of the helical record track TR of the data management region DITA.

The record data information and the absolute position information TS regarding to the data DATA recorded on the helical record track TR included in the data record region UDA on the magnetic tape 1 are recorded on the helical record track TR of the data management region DITA. As a result of this, it is relatively easy to access the data DATA recorded on the helical record track TR of the data record region UDA corresponding to the content of helical record track TR of the data management region DITA.

The head position of the data management region DITA and the head position of the data record region UDA are previously set by using the absolute position information TS so that the data management region DITA and the data record region UDA on the magnetic tape 1 can be accessed immediately in recording or reproducing.

And it has been achieved by provision of a data recording and/or reproducing apparatus for recording and/or reproducing file data DATA which is data composed of one or a plurality of blocks on helical recording tracks TR of a magnetic tape 1 by a file management device 11, comprising: a management information region SCD recording the management information of the file data DATA into the helical record tracks TR of the magnetic tape 1 so as to thereby detect the use of said helical record tracks TR.

There is provided in the helical record track TR of the magnetic tape the management information region SCD in which the management information SCD of the file data DATA is recorded. Thereby it is relatively easy to detect the use of the helical record tracks TR in reproducing.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A and 5B are diagrams serving for illustration of a format of a recording track on the magnetic tape;

FIG. 6 is a diagram serving for illustration of interleaving among the recording tracks;

DETAILED DESCRIPTION OF THE INVENTION

Figure 3:
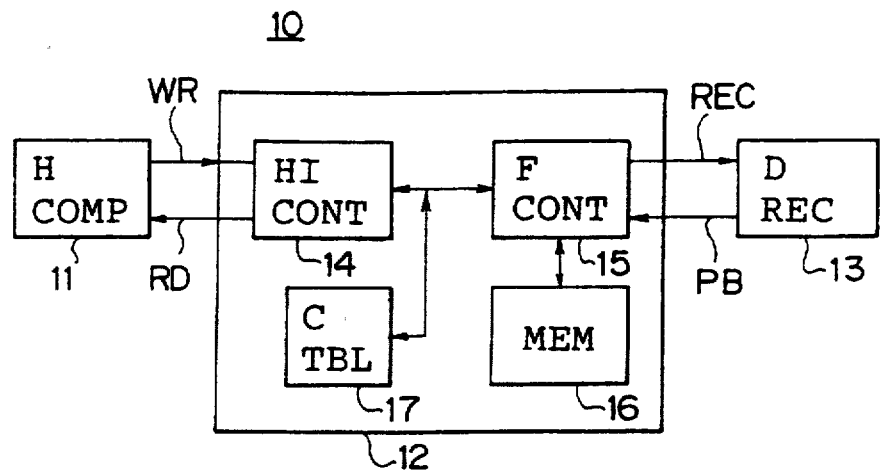
FIG. 3 is a block diagram showing a general configuration of a computer system to which a magnetic recording method of the present invention is applied.

Preferred embodiments of this invention will be described with reference to the accompanying drawings:

In FIG. 3 a reference numeral 10 denotes a schematic construction of a computer system to which the present invention is applied, wherein write data WR sent from a host computer 11 along with a write request is supplied to a data recorder 13 of ID-1 format as recording data REC through a data recorder control unit 12, and thus the write data WR is written in a recording track on the magnetic tape 1.

Then the magnetic tape 1 of the data recorder 13 is reproduced according to a read request inputted from the host computer 11, and reproducing data PB obtained in result is inputted to the host computer 11 as read data RD through the data recorder control unit 12.

The data recorder control unit 12 comprises a host interface control part 14 and a format control part 15, the host interface control part 14 controls a channel interface against the host computer 11, and the format control part 15 formats data transferred to the data recorder 13 by means of a memory 16.

Then, control information between the host interface control part 14 and the format control part 15 is transferred by reference to a control table 17.

Thus in the computer system 10, the data recorder control unit 12 provided as above is available to using the data recorder 13 as an external memory of the host computer 11 through the interface similar to a conventional magnetic tape recorder on a side of the host computer 11.

Figure 4A:
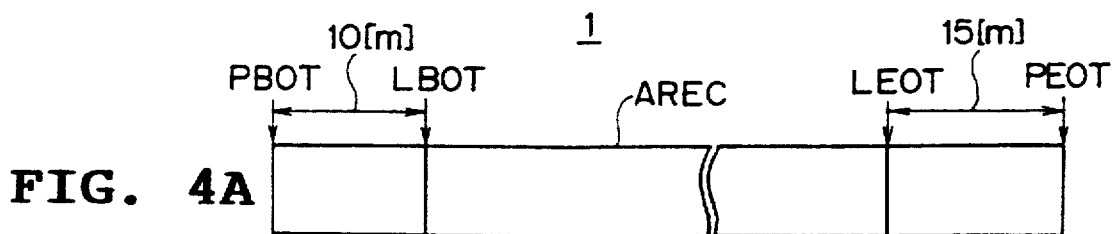
FIGS. 4A and 4B are diagrams serving for illustration of a recording area on a magnetic tape.
Figure 4B:
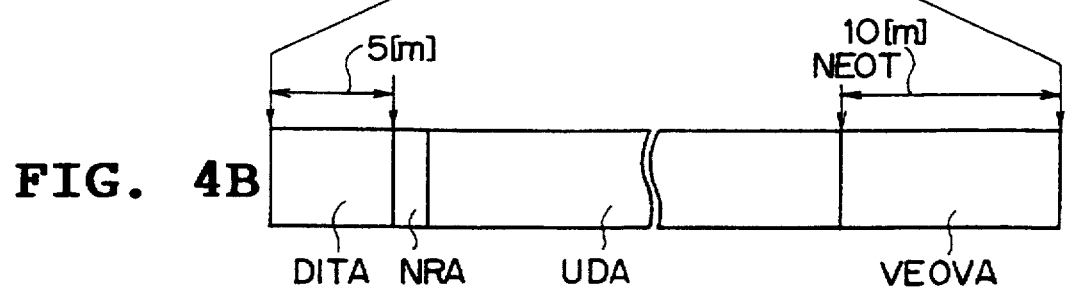

Here in the computer system 10, as shown in FIGS. 4A and 4B, a central portion of the magnetic tape 1 loaded in the data recorder 13 which is comparatively less in damage rate of the tape itself longitudinally is intended for a recording area AREC, thereby enhancing a bit error rate.

That is, as shown in FIG. 4A, a position 10 [m], where [m] represents meters, behind, for example, from a physical tip PBOT of the magnetic tape 1 is specified as a logical tip LBOT, a position 15 [m], for example, in front of a physical end PEOT of the magnetic tape 1 is specified as a logical end LEOT, and an area covering the logical tip LBOT to the logical end LEOT is intended for the recording area AREC.

In the recording area AREC, as shown in FIG. 4B, an area starting from the logical tip LBOT for a distance 5 [m] is intended for a directory information track area DITA.

Further, following the directory information track area DITA, an area covering the logical end LEOT to an end or around NEOT coming 10 [m], for example, in front thereof across a non-recorded area NRA is intended for user's recording track area UDA, and an area exceeding the end or around NEOT as far as the logical end LEOT is intended for a volume end information area VEOVA.

Here, in the computer system 10, a user data area 36,108 [BYTE] per recording track which is specified by ID-1 format is formatted as shown in FIGS. 5A and 5B, and the formatted data is interleaved in 4 tracks, thereby enhancing a bit error rate.

That is, in the computer system 10, as shown in FIG. 5A, the write data WR from the host computer 11 is recorded as 32,768 [BYTE] recording data DATA comprising 1 block, for example, per recording track with 4 tracks as one set.

In this case, as for the recording data DATA coming less than 32,768 [BYTE] per recording track TR, a first supplementary data PD1 is added to be 32,768 [BYTE] as whole. Then, a subcode data SCD for 320 [BYTE] is prepared for loading additional information of the recording track TR.

Moreover, in the data recorder control unit 12, 8 [BYTE] Read-Solomon error detecting/correcting code (hereinafter called C3 code C3 according to the C1 and C2 codes in ID-1 format) is added, as shown in FIG. 5A, by means of a predetermined generator polynomial at every 94 [BYTE] of the subcode data SCD, the recording data DATA or the first supplementary data PD1, an error correction can be carried out more securely thereby, and thus a bit error rate can further be enhanced.

Further, as shown in FIG. 6, for the subcode SCD, the recording data DATA, the first supplementary data PD1 and the C3 code C3 thus formatted per recording track, data for four recording tracks TR1, TR2, TR3 and TR4 is interleaved among the tracks according to a predetermined process, thereby enhancing the bit error rate further.

Then, a second supplementary data PD2 of 204 [BYTE] is added ahead of data for each recording track interleaved for the four recording tracks TR1, TR2, TR3 and TR4, and thus data content for one recording track TR amounts to 36,108 [BYTE] specified by ID-1 format.

Then, from formatting the second supplementary data PD2 ahead as above, the supplementary data PD2 can be assigned to a magnetic head running-in portion of the recording tracks where the magnetic tape 1 is capable of damaging in most cases and a tracking is not stable, thereby enhancing further the bit error rate for the recording data DATA.

Here in the case of computer system 10, additional information loaded in the subcode data SCD comprises track classification information TRID indicating a classification of the corresponding recording track TR, a block number BLNO that the recording track TR belongs, a file number FLNO that the recording track TR belongs, a write retry frequency RTCT with reference to the recording tracks and a byte count BYCT of data included in the recording tracks.

Classification information of volume information table VIT, file information table FIT, update information table UIT, dummy data track information DMY or recording end information EOR is recorded in the track classification information TRID.

Figure 7:
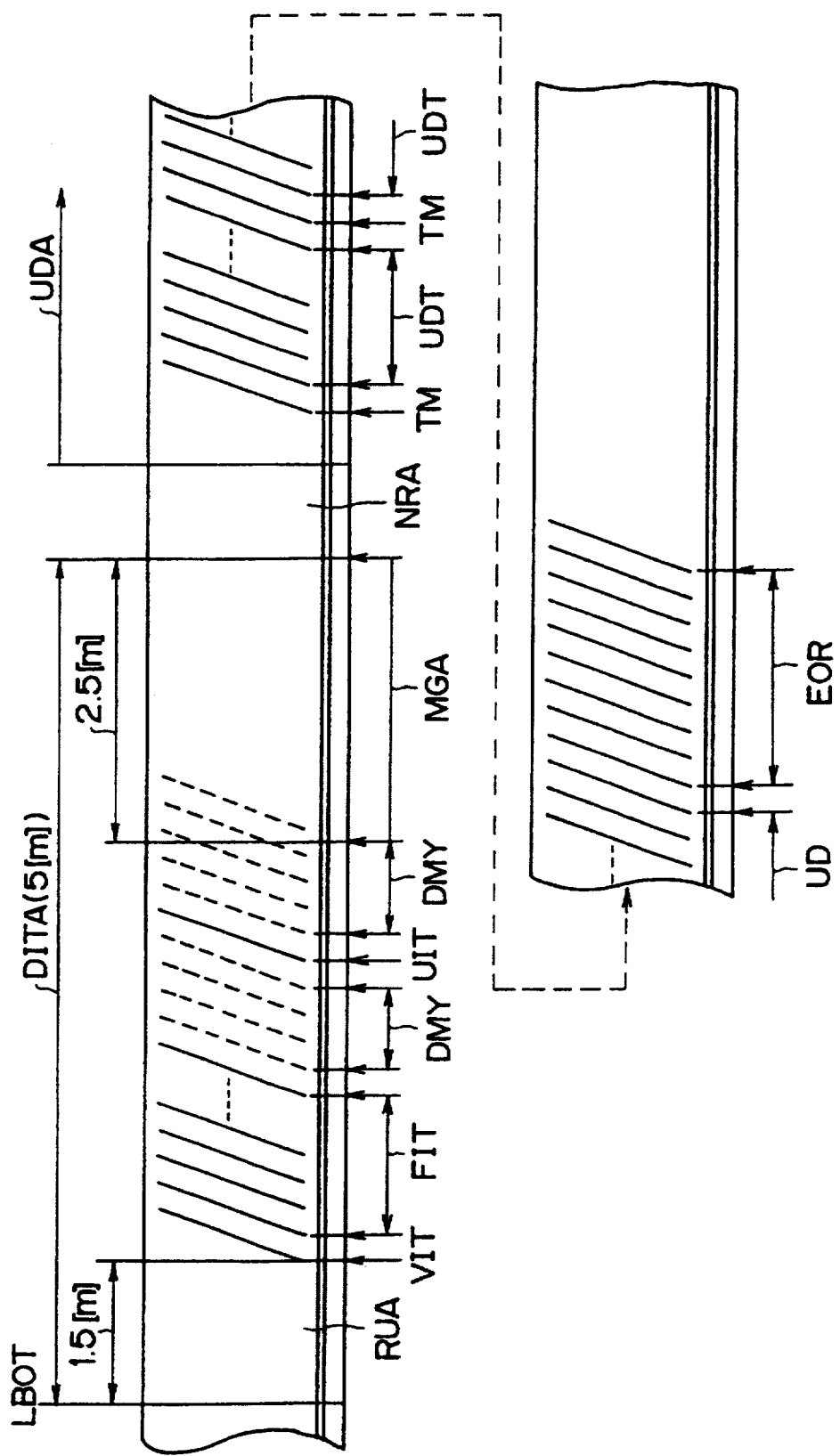
FIG. 7 is a diagram serving for illustration of a track format on the magnetic tape.

Here, as shown in FIG. 7 practically, volume information table VIT, file information table FIT, update information table UIT or dummy data track information DMY is used as the track classification information TRID of the recording track TR formed in the directory information track area DITA of the magnetic tape 1 first.

The directory information table DIT for managing files on the magnetic tape 1 as a whole is recorded in the directory information track area DITA, and the recording track comprising volume information table VIT is recorded first in a set of four tracks continuously to a 1.5 [m] rise area RUA from the logical tip LBOT of the magnetic tape 1.

First and final position information of the data block recorded in the user recording track area UDA with the whole magnetic tape 1 as one volume, length information of the file information table FIT and a block number of the data block wherein write retry has been executed in recording are recorded in the recording data DATA of the volume information table VIT.

The file information table FIT is recorded in 256 tracks continuing to the volume information table VIT. A first position information and a block length of the file are recorded in the recording data DATA of the file information table FIT in the unit of file recorded in the user recording track area UDA.

Further the dummy data track information DMY is recorded in succession to the file information table FIT in a predetermined track number, and the update information table UIT is recorded in the following four recording tracks. Information indicating whether or not updated is recorded in the recording data DATA of the update information table UIT.

Further in succession to the update information table UIT, dummy data track information DMY is recorded in the recording track 2.5 [m] from the first of the directory information track area DITA, and the remaining 2.5 [m] directory information track area DITA is secured as a margin area MGA.

Next, the user data track information UDT, the tape mark track information TM or the recording end information EOR is used as the track classification information TRID of the recording track TR formed in the user recording track area UDA across the non-recording area NRA in succession to the directory information track area DITA of the magnetic tape 1.

The recording track TR of the user data track information UDT for a plurality of blocks constructing one file is recorded among the recording tracks TR of the tape mark track information TM with four tracks as one unit as the recording track TR of the user recording track area UDA, and the recording track TR of the recording end information EOR is recorded in succession to the last of the user data track information UDT.

Then, the first supplementary data PD1 of 32,768 [BYTE] is recorded in the recording data DATA of the tape mark track information TM and the recording end information EOR, and data corresponding to the write data WA inputted from the host computer 11 is recorded in the recording data DATA of the recording track TR of the user recording track area UDA.

Thus, in the computer system 10, the directory information track area DITA is provided ahead of the magnetic tape 1, and a content of the user recording track area UDA is controlled in files, thus data recorded in the data recorder 13 is accessible like an external recording apparatus viewed from the host computer 11.

Figure 8:
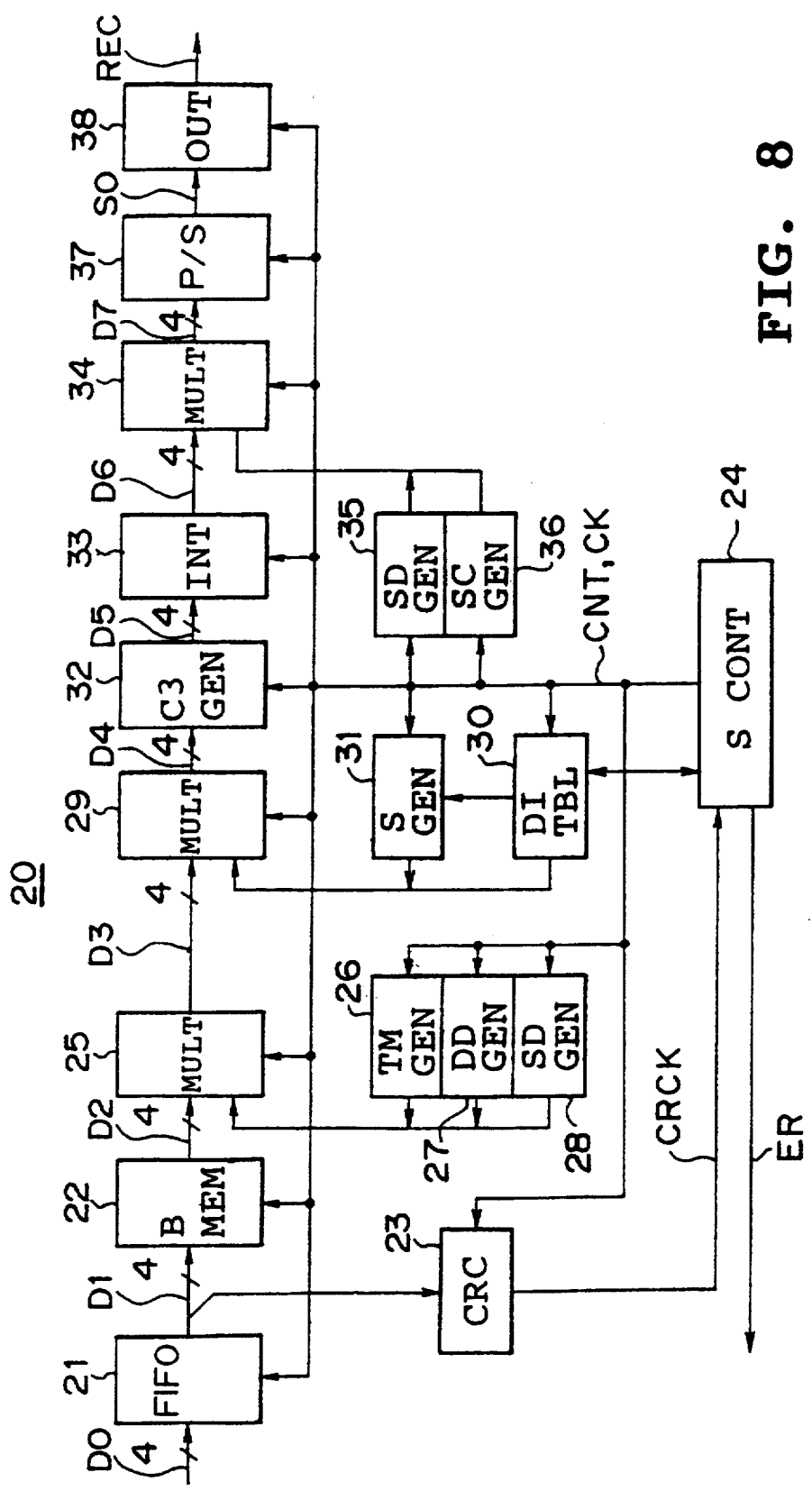
FIG. 8 is a block diagram showing a configuration of a recording format control portion.
Figure 9:
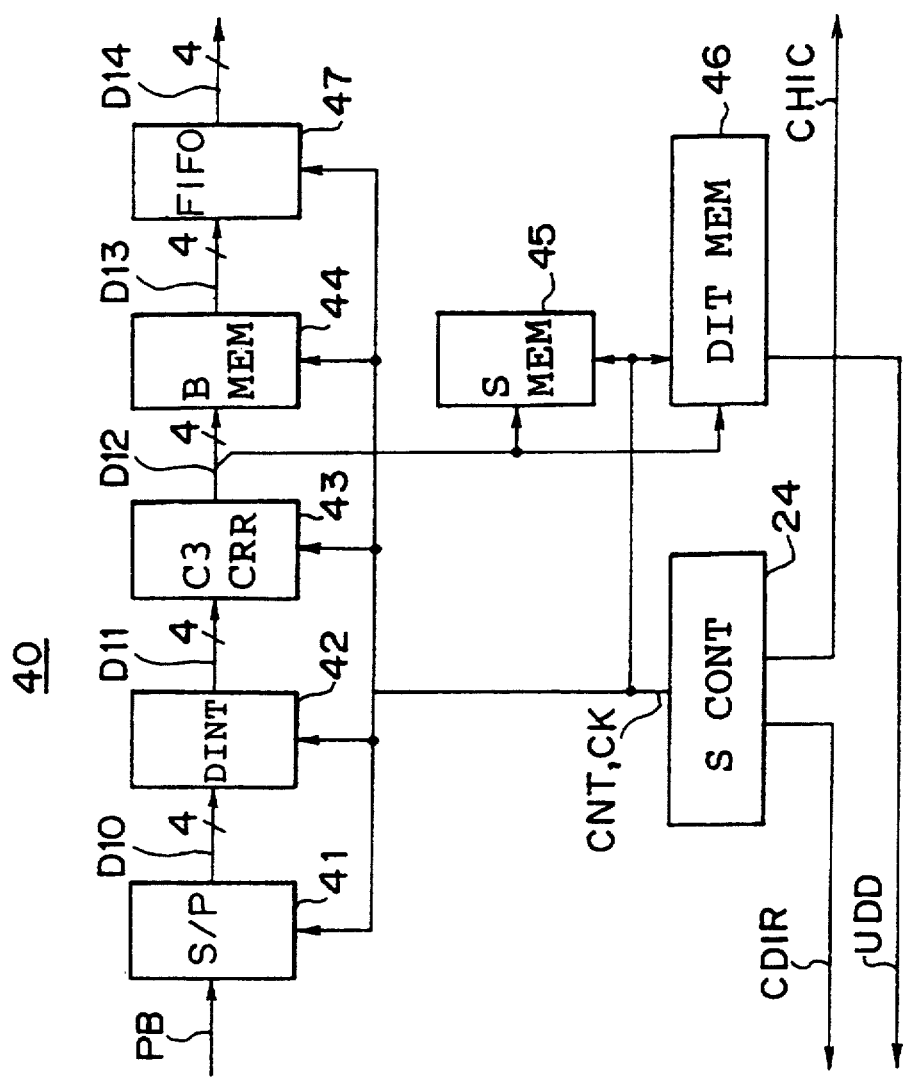
FIG. 9 is a block diagram showing a configuration of a reproducing format control portion.

Here, the format control part 15 of the data recorder control unit 12 in the computer system 10 comprises a recording format portion 20 and a reproducing format portion 40 as shown in FIG. 8 and FIG. 9 along with the memory 16.

That is, in the recording format control portion 20, from inputting data at every 32 bits to a memory (comprising first-in-first-out (FIFO)) circuit 21 from the host interface control part 14 as 4-channel 8-bit parallel write data D0, the write data D0 is synchronized with an internal clock CK, which is written in a buffer memory 22 as input data D1 and sent to a CRC error detection circuit 23.

Then, in the recording format control portion 20, the write data D0 is processed at every 4 channels, however, data for one channel will be referred to for description of the recording format control portion 20.

The CRC error detection circuit 23 carries out an error detection on the input data D1 by means of CRC (cyclic redundancy code), and inputs a detection result CRCK to a system control circuit 24 in a computer configuration including CPU.

Then, when detecting an error of the input data D1 according to the detection result CRCK of the CRC error detection circuit 23, the system control circuit 24 sends it back to the host interface control part 14 as an error detection signal ER.

As a result, for example, the host interface control part 14 executes resending with reference to the write data D0 in which an error is present.

The buffer memory 22 buffers one recording track TR as described with FIGS. 5A and 5B with reference to the input data D1, and sends a first buffer data D2 according to the recording data DATA obtained consequently to a first multiplexer 25.

In addition to the first buffer data D2, a first supplementary data PD1 for the tape mark track information TM sent from a tape mark generation circuit 26, dummy data for the dummy data track information DMY sent from a dummy data generation circuit 27, and the first supplementary data PD1 to the recording data DATA sent from a supplementary data generation circuit 28 are inputted each to the first multiplexer 25.

Thus the first multiplexer 25 generates a second buffer data D3 by adding the first supplementary data D1 to the recording data DATA of the first buffer data D2 according to a control signal CNT inputted from the system control circuit 24, and sends it to a second multiplexer 29.

In addition to the second buffer data D3, the directory information table DIT sent from a directory information table memory 30, and the subcode data SCD generated in a subcode generation circuit 31 according to a content of the directory information table 30 are inputted to the second multiplexer 29.

Practically, the directory information table DIT described with FIG. 7 is stored in the directory information table memory 30, and the subcode generation circuit 31 generates first and last position information of the data block, length information of the file information table FIT and a block number of the data block having executed rewrite in recording according to a content of the directory information table DIT.

Thus the second multiplexer 25 forms the format described with FIGS. 5A and 5B by adding the subcode data SCD to the second buffer data D3 according to the control signal CNT inputted from the system control circuit 24, and then sends it to a C3 code generation circuit 32 as third buffer data D4.

As described with FIGS. 5A and 5B, the C3 code generation circuit 32 generates the C3 code C3 of 8 [BYTE] to add it to the third buffer data D4, and sends a recording track data D5 obtained consequently to an interleaving circuit 33.

The interleaving circuit 33 executes interleaving for the four tracks shown in FIG. 6 by loading a recording track data D5 for the four tracks into an interleave memory in sequence and outputting it in the predetermined order, and then sends second recording track data D6 obtained consequently to a third multiplexer 34.

In addition to the second recording track data D6, the second supplementary data PD1 sent from a second supplementary data generation circuit 35, and synchronizing code data sent from a synchronizing code generation circuit 36 are inputted to the third multiplexer 34.

Thus the third multiplexer 34 adds the second supplementary data PD2 and the synchronizing code data to the second recording track data D6 according to the control signal CNT inputted from the system control circuit 24, and sends a third recording track data D7 thus obtained to a parallel-serial conversion circuit 37.

The parallel-serial conversion circuit 37 converts the 4-channel 8-bit parallel third recording track data D7 into a serial recorder data S0 for 32 bits, which is inputted to the data recorder 13 as recording data REC through an output circuit 38.

Figure 1:
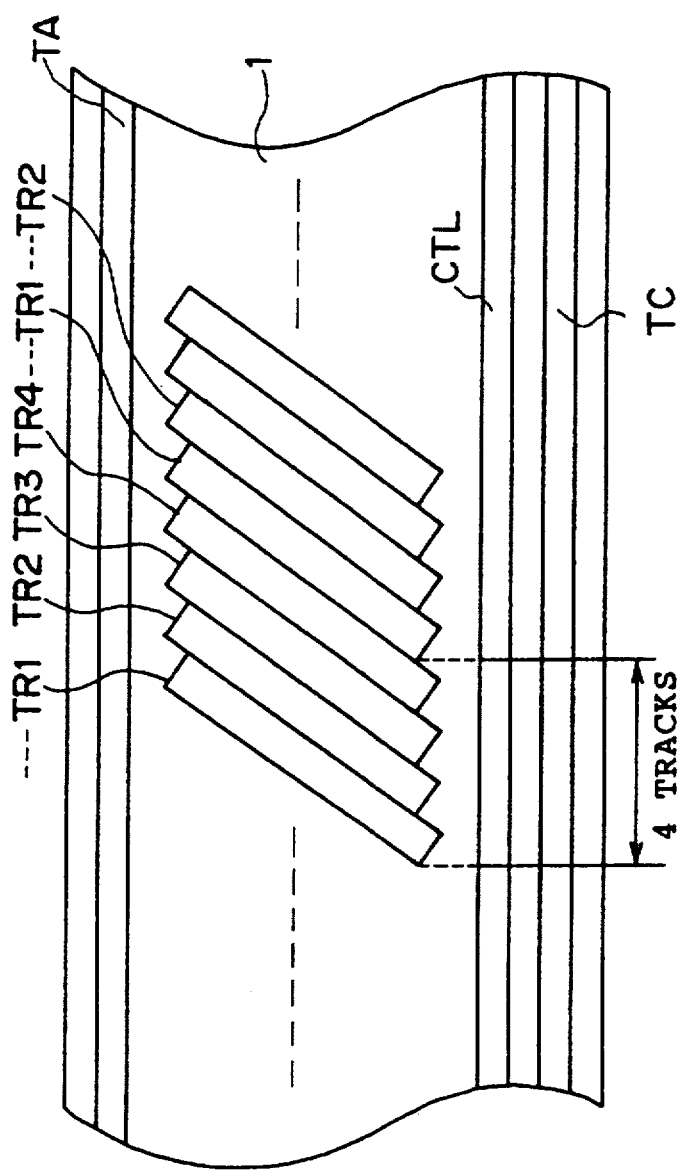
FIG. 1 is a diagram serving for illustration of a recording format on the magnetic tape according to ID-1 format.
Figure 2:
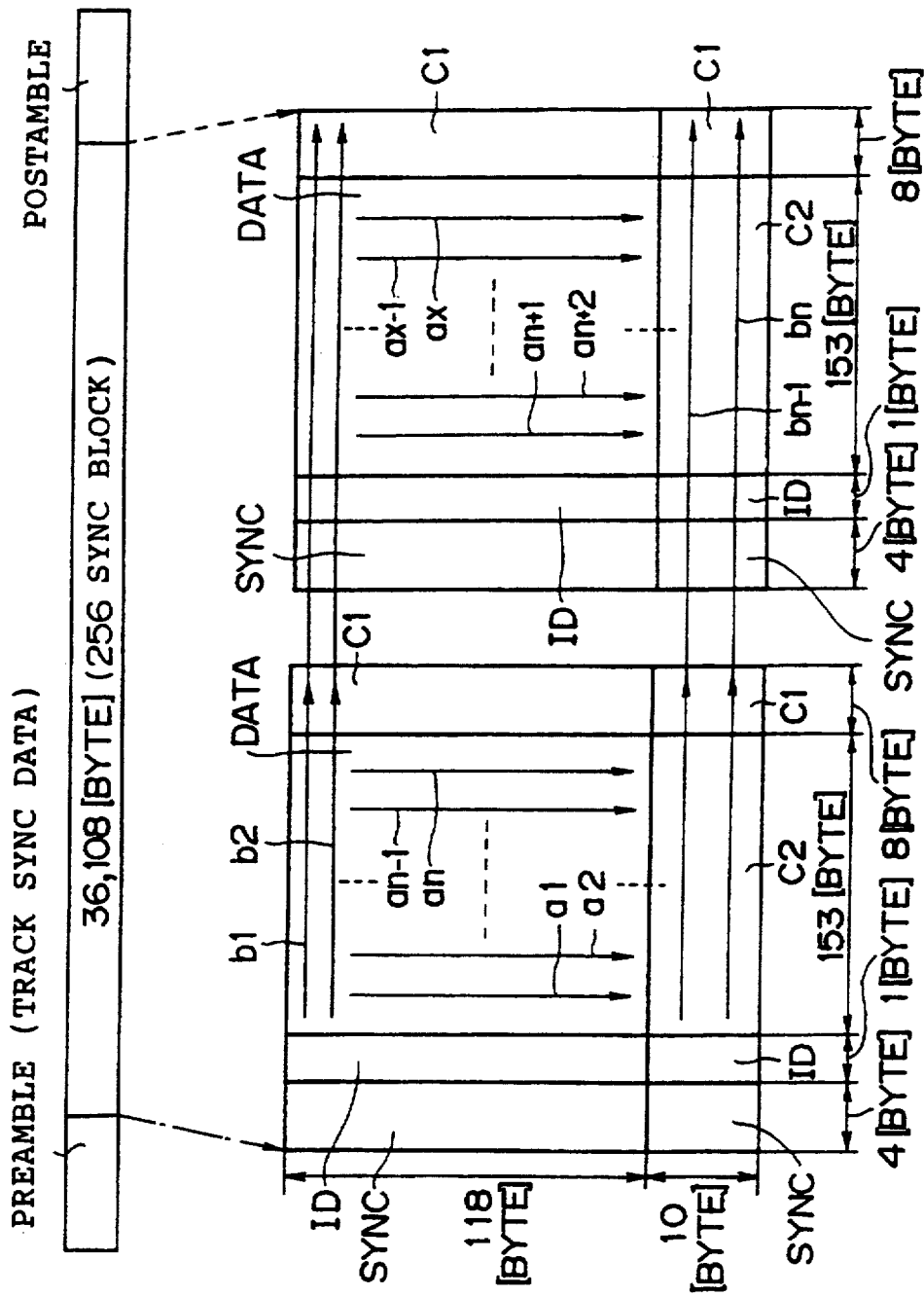
FIG. 2 is a diagram serving for illustration of interleaving of ID-1 format.

Thus, the recording format control portion 20 of the format control part 15 executes formatting described with FIGS. 5A and 5B to FIG. 7 for the write data D0 inputted from the host interface control part 14, generates the recording data REC accordingly, and then records it in the magnetic tape 1 according to ID-1 format as shown in FIG. 1 and FIG. 2.

Here, in a reproducing format portion 40 shown in FIG. 9, a serial reproducing data PB reproduced by the data recorder 13 is inputted to a serial-parallel conversion circuit 41, converted into a 4-channel 8-bit parallel first reproducing data D10, which is inputted to a deinterleaving circuit 42.

The deinterleaving circuit 42 carries out deinterleaving corresponding to interleaving of the interleaving circuit 33 by loading in the first reproducing data D10 in sequence as in the case of the interleaving circuit 33 of the recording format portion 20 and outputting in the predetermined order, and inputs a second reproducing data D11 obtained consequently to a C3 error correction circuit 43.

The C3 error correction circuit 43 carries out an error correction for the second reproducing data D11 by means of the C3 code C3 added by the C3 code generation circuit 32 of the recording format portion 20, and sends a third reproducing data D12 thus obtained.

Practically, of the third reproducing data D12, which corresponds to the user recording data track UDT, as shown in FIG. 7, is inputted to a buffer memory 44, and which corresponds to the directory information table DIT is inputted to a subcode memory 45 and a directory information table memory 46.

In the buffer memory 44, the first supplement data PD1 included in the third reproducing data D12 is deleted, inputted to a memory circuit 47 as a fourth reproducing data D13 and synchronized with an external clock, and is then sent to the host interface control part 14 as read data D14 outputted from the reproducing format control portion 40.

Then, when the directory information table DIT inputted to the directory information table memory 46 is updated, the system control circuit 24 sends update information UDD of the directory information table DIT to the data recorder 13 together with a data recorder control signal CDIR, and updates a content of the directory information table DIT on the magnetic tape 1.

Further the system control circuit 24 sends an answer to the data reproducing request inputted from the host interface control part 14 to the host interface control part 14 as a control signal CHIC together with output data D14.

Thus the reproducing format control portion 40 of the format control part 15 subjects the reproducing data PB reproduced by the data recorder 13 to formatting counter to the formatting described with FIGS. 5A and 5B to FIG. 7, generates the read data D14 and sends it to the host interface control part 14.

Figure 10:
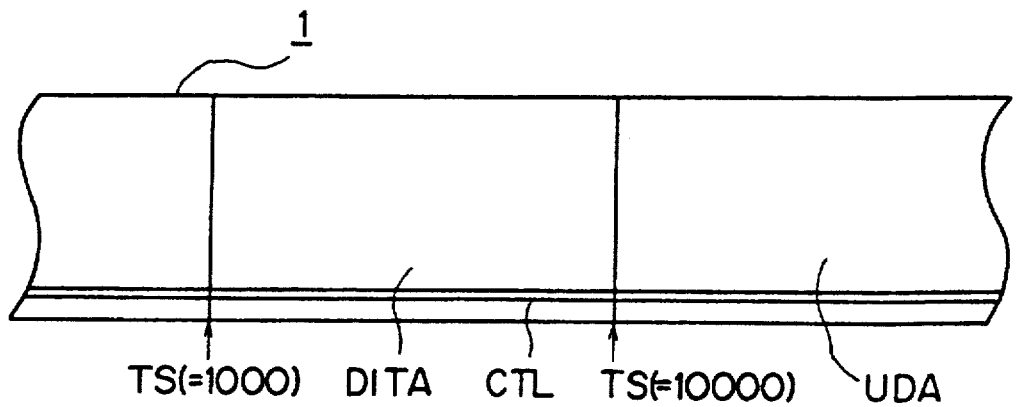
FIG. 10 is a schematic view for explaining a record area of magnetic tape of one embodiment of the present invention.

FIG. 10 denotes a record region on the magnetic tape 1 of the embodiment. The directory information table region DITA described above in FIG. 2B is predetermined to begin from an absolute position represented by a track set identification value TS, for example "1,000", which is recorded on the control track CTL of the magnetic tape 1, and similarly the user record track region UDA is predetermined to begin from an absolute position of the value TS "10,000".

In thus construction, the control signals sent from the host computer 11 as an instruction are inputted via the host interface control part into the control table 17 and are interpreted by the CPU of the system control circuit 24 of the format control part 15.

When the instruction, for example, for recording the write data WR of predetermined blocks is inputted from the host computer 11, the system control circuit 24 makes ready to take the data into the memory 16, and then takes the write data WR from the host computer 11 into the memory 16 on being ready.

Further when the instruction for terminating the transmission of the write data WR is inputted from the host computer 11, the system control circuit 24 calculates the data quantity taken into the memory 16, produces the subcode data included the data quantity and the addition information of the block to be recorded and writes the subcode data into the memory of the subcode generation circuit 31.

If the memory 16 may overflow as the result of repeating this process, the system control circuit 24 instructs to the data recorder 13 a command to begin recording from the predetermined track set identification (here the value TS is "10,000"), and executes the process of recording data.

Simultaneously record processing the data, the system control circuit 24 writes the contents of the data recorded and the value TS of the track set identification recorded into the memory of the directory information table 30.

When also the command writing a tape mark from the host computer in addition to the data is inputted, the system control circuit 24 writes the tape mark information into the memory of the directory information table 30, and controls the record format control part 20 to record the tape mark track information on the magnetic tape 1 of the data recorder 13.

Subsequently when a tape unload instruction is inputted from the host computer 11, the system control circuit 24 controls data recorder 13 to rewind the magnetic tape 1 by predetermined track set identification (here the value TS is 1,000), transfers the contents of the directory information to the memory 16 for data, record similarly in data recording, and thus the directory information table region DITA of a magnetic tape is formed.

In reproducing the data recorded thus on the magnetic tape 1, the system control circuit 24 reproduces first the directory information table region DITA included in the predetermined track set identification (here the value TS is 1,000), and then takes it in the directory information table memory 46. As the result of this the system control circuit 24 can manage that any kind of data is recorded on the magnetic tape 1.

In this state, when there is inputted a read request for a specified block from the host computer 11, the system control circuit 24 reads out the value of the track set identification of the specified block referring to the directory information table memory 46, and controls the data recorder 13 to reproduce the data from the track set read out to the track set corresponding to the predetermined data quantity.

When as result of this there are accumulated the data in the memory 16 by taking the reproduced data PB from data recorder 13 in the memory for data, the data are transferred to the host computer 11 as the data read out.

On the case where there are the tape mark track information TM on the record end information EOR as the subcode data SCD of the reproduction data PB obtained from the data recorder 13, these information may be reported to the host computer 11.

With construction described above, in regard to the data recorded on the record track included the user record track region UDA of the magnetic tape 1, the addition information and the track set identification being the absolute position information of the record track TR are recorded on the record track TR of the directory information table region DITA, thereby it is realized the data recorder 13 in which it is feasible to access the data recorded on the record track TR of the user record track region UDA according to the content of the record track TR of the directory information table region DITA.

Further with construction described above, the front position of the directory information table region DITA and the user record track region UDR is previously set by using the track set identification, thereby it is realized the data recorder 13 in which it is feasible immediately to access the directory information table region DITA and the user record track region UDA of the magnetic tape 1 in recording and reproducing.

Further the subcode data SCD corresponding to the file management information is recorded on the record tracks TR of the magnetic tape 1, thereby the data recorder 13 can be realized in which the use of the record track is detected corresponding to the content of the subcode data SCD to execute file management.

In the embodiment described above, there are provided the directory information table region DITA and the user record track region UDA on the magnetic tape the absolute positions of which are represented by the track set identification, however, the present invention is in addition to this, and an absolute address meant a physical recording track and a corresponding block may be defined on the magnetic tape and recorded on the directory information table region DITA to be manage.

Figure 11:
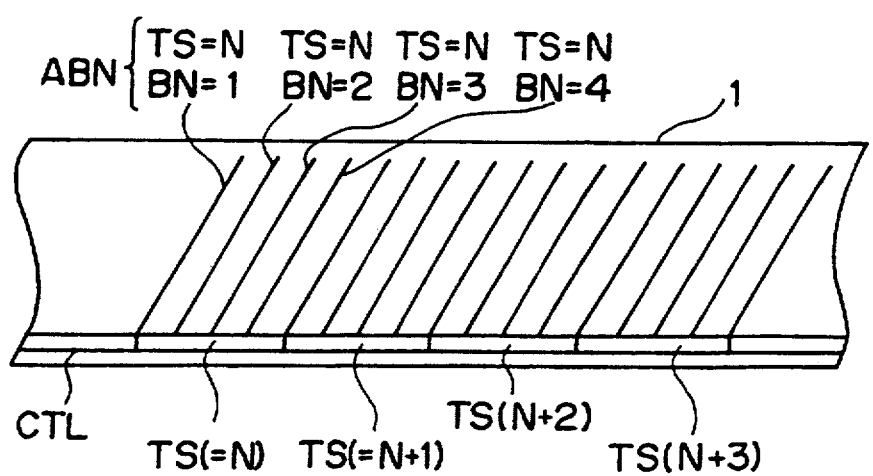
FIG. 11 is a schematic view for explaining a block management method.

As shown in FIG. 11, for example, if one record track is assigned one block, the absolute address ABN may be represented by the value TS (=N) of the track set identification and the block number BN (=1, 2, 3, 4) of the track set identification.

In such a case, a region for recording the absolute address ABN, a file size and addition information may be made sure of on the directory information table region DITA in the format control part 15, addition information assigned from the host computer 11 may be respectively recorded to this region and the information of this region may be transferred according to a request from the host computer.

Thus, in the host computer 11, the data can be managed with a file image by using the magnetic tape, and it can be easier to use.

In the embodiment described above, data of every 4 tracks are interleave-processed, however the present invention is not limited thereto, for example, data of every 8 tracks may be interleave-processed.

In the embodiment described above, the present invention is applied to an external storage device of a computer, however, the present invention may be widely applied to various magnetic recording and/or reproducing apparatuses.

In the above-described embodiment, while the frequency of the write retry process that the write retry circuit carries out is not particularly limited, however, a limit of, for example, ten times or so will be provided instead, and in case the write retry frequency in the subcode data exceeds the limit, a message such as "unable to record" or the like may be applied to the recording data and so transmitted to the host computer.

Further in the above-described embodiment, a description has referred to the case where the present invention is applied to an external memory of the computer, however, the present invention is not necessarily limited thereto, and thus is applicable extensively to various magnetic recording and reproducing apparatuses.

Further the subcode data SCD corresponding to the file management information is recorded on the record tracks TR of the magnetic tape 1, thereby the data recorder 13 can be realized in which the use of the record track is detected corresponding to the content of the subcode data SCD to execute file management.

As described above, according to the present invention, record data information and absolute position information regarding data recorded on helical record tracks included in a data record region of a magnetic tape are recorded on helical record tracks of a data management region, thereby a magnetic recording and/or reproducing apparatus in which it is feasible to access the data recorded on the helical record tracks of the data record region according to contents of the helical record tracks of the data management region can be readily realized. A front position of the data management region and a front position of the data record region are previously set by using an absolute position information, thereby a magnetic recording and/or reproducing apparatus may be realized in which the data management region and the data record region on the magnetic tape may be immediately accessed in recording and reproducing.

Therefore, the data management region and the data record region on the magnetic tape may be accurately accessed, thereby markedly enhancing the bit error rate and providing an optimal magnetic recording and/or reproducing apparatus as an external storage record device of a host computer system.

Further in a magnetic recording and/or reproducing apparatus wherein file data of one or a plurality of blocks are recorded and/or reproduced on the helical record tracks of a magnetic tape by means of a file management apparatus, a management information region is provided in the helical record track so as to record the management information of the file data, resulting in a magnetic recording and/or reproducing apparatus in which it is feasible to detect the use of helical record tracks in reproducing.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. Apparatus for recording file data on helical recording tracks of a record tape comprising:
   input means for receiving at least one block of file data;
   means for recording said file data in respective helical tracks;
   management information means for providing management information identifying contents of said helical tracks in which said file data is recorded; and
   means for recording said management information in respective helical tracks which are separate from said helical tracks in which said file data is recorded, said tracks in which said management information and said file data are respectively recorded being in assigned management information and data regions, respectively, of said tape.

2. The apparatus of claim 1 wherein said management information comprises subcode data identifying the content of said helical tracks.

3. The apparatus of claim 2 further comprising means for recording in said data region mark information representing beginning and ending of said file data in a helical track.

4. The apparatus of claim 1 wherein said means for recording said management information includes means for recording in a longitudinal track of said record tape absolute position information representing locations of helical tracks in which predetermined portions of said file data are recorded.

5. The apparatus of claim 4 wherein said predetermined portions include a beginning portion of said file data.

6. The apparatus of claim 4 wherein said means for recording said file data includes interleave means for interleaving plural blocks of file data and for recording the interleaved blocks in a set of helical tracks; and said absolute portion information is formed of a track set identification value and a data block number.

7. The apparatus of claim 4 wherein said absolute position information contains data representing a beginning location of said management information recorded in a helical track.

8. The apparatus of claim 1, wherein said management information region admits of a format different than a format of said data region.

9. Apparatus for reproducing at least one block of file data from helical tracks located in a data region of a record tape, said record tape including separate helical tracks located in a management information region and containing only management information identifying contents of respective helical tracks in which said file data is recorded, said apparatus comprising:
   means for reproducing the management information and the file data from the separate respective helical tracks in said management information region and said data region, respectively, of said tape; and
   detecting means responsive to the reproduced management information to identify said contents of the helical tracks in which said file data is recorded.

10. The apparatus of claim 9 wherein said management information includes subcode data recorded in said helical tracks in said management information region and identifying the contents of the helical tracks in which said file data is recorded.

11. The apparatus of claim 9 wherein mark information representing beginning and ending portions of said file data is recorded in a helical track; and wherein said detecting means is operable to detect said mark information.

12. The apparatus of claim 9 wherein said record tape includes a longitudinal track in which absolute position information is recorded, said absolute position information representing locations of helical tracks in which predetermined portions of said file data or management information are recorded.

13. The apparatus of claim 9 wherein said absolute position information identifies a beginning portion of file data in a helical track.

14. The apparatus of claim 13 wherein a block of file data is recorded in interleaved format with other blocks of file data in a set of helical tracks; and said absolute position information is formed of a track set identification value and a data block number.

15. The apparatus of claim 12 wherein said absolute position information identifies a beginning portion of management information in a helical track.

16. The apparatus of claim 9, wherein said management information region admits of a format different than a format of said data region.

* * * * *

UNITED STATES PATENT AND TRADEMARK OFFICE
CERTIFICATE OF CORRECTION

PATENT NO. : 5,361,179

DATED : November 1, 1994

INVENTOR(S) : Hideto Suzuki et al.

It is certified that error appears in the above-identified patent and that said Letters Patent is hereby corrected as shown below:

On title page, item [73]
Change:

"Assignee:   Sony Corporation, Tokyo, Japan"   to

--Assignee: Sony Corporation, Tokyo, Japan and
            Fujitsu Limited, Kanagawa, Japan--

Signed and Sealed this

Fourteenth Day of March, 1995

*Attest:*

BRUCE LEHMAN

*Attesting Officer*   *Commissioner of Patents and Trademarks*